(12) United States Patent
Singhal

(10) Patent No.: US 12,363,199 B2
(45) Date of Patent: Jul. 15, 2025

(54) SYSTEMS AND METHODS FOR MOBILE WIRELESS ADVERTISING PLATFORM PART 1

(76) Inventor: Tara Chand Singhal, Torrance, CA (US)

(*) Notice: Subject to any disclaimer, the term of this patent is extended or adjusted under 35 U.S.C. 154(b) by 0 days.

(21) Appl. No.: 12/287,594

(22) Filed: Oct. 10, 2008

(65) Prior Publication Data

US 2009/0276303 A1    Nov. 5, 2009

Related U.S. Application Data

(60) Provisional application No. 61/132,662, filed on Jun. 20, 2008, provisional application No. 61/126,345, filed on May 3, 2008.

(51) Int. Cl.
*G06Q 30/0251*   (2023.01)
*G06Q 30/02*   (2023.01)
(Continued)

(52) U.S. Cl.
CPC ............ *H04L 67/53* (2022.05); *G06Q 30/02* (2013.01); *G06Q 30/0207* (2013.01); *G06Q 30/0208* (2013.01); *G06Q 30/0215* (2013.01); *G06Q 30/0217* (2013.01); *G06Q 30/0241* (2013.01); *G06Q 30/0249* (2013.01); *G06Q 30/0255* (2013.01); *G06Q 30/0257* (2013.01);
(Continued)

(58) Field of Classification Search
USPC .................. 705/14.1, 14.38, 14.64, 14.65
See application file for complete search history.

(56) References Cited

U.S. PATENT DOCUMENTS 8,000,749 B1 *   8/2011   McConnell ............ G06Q 30/02
455/566
8,107,940 B1 *   1/2012   Jackson ............ G06Q 30/0272
455/418
(Continued)

FOREIGN PATENT DOCUMENTS

KR           20070117881 A   *   12/2007

OTHER PUBLICATIONS

"Bellsouth, IBM unveil personal communicator phone", Mobile Phone News, Nov. 8. 1993, pp. 1-3.*
(Continued)

*Primary Examiner* — Bion A Shelden
(74) *Attorney, Agent, or Firm* — Kasha Law LLC; John R. Kasha; Kelly L. Kasha

(57) ABSTRACT

A system of wireless advertising platform has a handheld wireless device that has an inbound wireless data function with a storage function to be able to receive and store, audio, text, image, and flash commercial messages from a message server. The device has a message exposure function that exposes these messages to a device user from the stored memory of the device into the incoming and outgoing communication, to and from the device user. The device has a message tracking function that tracks which messages have been exposed and periodically sends an account record to the message server. The message server receives the account records and uses cumulative account records to create billing statements to the message providers. The communication use cost of the device is discounted to the device user for being exposed messages from revenue from message providers.

24 Claims, 11 Drawing Sheets

| Msg. ID 58 | Code 73 | Msg Type 65 | Messages 66 | Duration 68 | Int. Add 70A |
|---|---|---|---|---|---|
| A345 | 10 | xxx | file1.txt (66A) | x sec. | z@zal.com |
| .... | ..... | xxx | file2.wave (66B) | | |
| | | xxx | file3.msg (66C) | | |
| | | | ......... | | |

Device Message Function 18

| Device Id 72 | List of Msgs. Used | Period |
|---|---|---|
| | | |
| | | |

(51) Int. Cl.

| | | |
|---|---|---|
| *G06Q 30/0207* | (2023.01) | |
| *G06Q 30/0208* | (2023.01) | |
| *G06Q 30/0217* | (2023.01) | |
| *G06Q 30/0241* | (2023.01) | |
| *G06Q 30/0272* | (2023.01) | |
| *G06Q 40/12* | (2023.01) | |
| *H04L 12/18* | (2006.01) | |
| *H04L 51/58* | (2022.01) | |
| *H04L 67/04* | (2022.01) | |
| *H04L 67/52* | (2022.01) | |
| *H04L 67/53* | (2022.01) | |
| *H04L 67/55* | (2022.01) | |
| *H04M 3/02* | (2006.01) | |
| *H04M 3/42* | (2006.01) | |
| *H04M 3/487* | (2006.01) | |
| *H04W 4/029* | (2018.01) | |
| *H04W 4/18* | (2009.01) | |

(52) U.S. Cl.
CPC ..... *G06Q 30/0267* (2013.01); *G06Q 30/0272* (2013.01); *G06Q 30/0277* (2013.01); *G06Q 40/12* (2013.12); *H04L 12/1859* (2013.01); *H04L 51/58* (2022.05); *H04L 67/04* (2013.01); *H04L 67/52* (2022.05); *H04L 67/55* (2022.05); *H04M 3/02* (2013.01); *H04M 3/42017* (2013.01); *H04M 3/42178* (2013.01); *H04M 3/4878* (2013.01); *H04W 4/029* (2018.02); *H04W 4/18* (2013.01); *H04M 2201/38* (2013.01); *H04M 2203/2083* (2013.01); *H04M 2215/0192* (2013.01)

(56) References Cited

U.S. PATENT DOCUMENTS

| | | | | |
|---|---|---|---|---|
| 2002/0077900 | A1* | 6/2002 | Thompson | H04L 67/14 705/14.49 |
| 2002/0120666 | A1* | 8/2002 | Landsman | G06Q 30/0273 709/200 |
| 2003/0040965 | A1* | 2/2003 | Gelissen | G06Q 30/0226 705/14.12 |
| 2003/0050837 | A1* | 3/2003 | Kim | 705/14 |
| 2006/0282316 | A1 | 12/2006 | Snyder et al. | |
| 2006/0288091 | A1* | 12/2006 | Oh | A63F 13/12 709/219 |
| 2007/0006327 | A1* | 1/2007 | Lal | G06F 21/10 726/31 |
| 2007/0100690 | A1* | 5/2007 | Hopkins | G06Q 30/02 705/14.67 |
| 2007/0116227 | A1* | 5/2007 | Vitenson et al. | 379/207.02 |
| 2007/0136761 | A1* | 6/2007 | Basmajian | H04N 21/41407 725/62 |
| 2007/0244752 | A1* | 10/2007 | Bayne | G06Q 30/0272 705/14.66 |
| 2007/0294292 | A1* | 12/2007 | Hydrie | H04W 99/00 |
| 2008/0207328 | A1* | 8/2008 | Slough | G06Q 30/02 463/42 |
| 2008/0243619 | A1* | 10/2008 | Sharman | G06Q 30/0267 705/14.54 |
| 2008/0299971 | A1* | 12/2008 | Cai | H04L 65/1016 455/435.1 |
| 2009/0055256 | A1* | 2/2009 | Donahue | G06Q 30/0273 705/14.69 |
| 2009/0132364 | A1* | 5/2009 | Agarwal | G06Q 30/0267 705/14.61 |
| 2009/0147778 | A1* | 6/2009 | Wanless | H04M 7/0042 370/389 |
| 2009/0210385 | A1* | 8/2009 | Ramaswamy | G06Q 30/0254 |

OTHER PUBLICATIONS

The International Search Report and written opinion of the International Searching Authority for PCT/US2009/041987, dated Jun. 19, 2009.

International Preliminary Report on Patentability, dated Nov. 9, 2010, for PCT/US2009/041987, attached. Note: Claims 1-26 only are in this application, mailed Dec. 28, 2010.

The End of Advertising as We Know It, a 2007 report by Dr. Saul J. Berman, and Bill Battino of IBM Institute for Business Value, IBM Global Business Services.

USA Lags on Cell Phones' Marketing Potential, by Theresa Howard, USA Today, Thu Jun. 19, 2008.

* cited by examiner

Text message communication 32
  Outgoing text message 32A
    - sense initiation of text messaging on device 12
    - delay/hold initiation
    - search list 74 to find a commercial message based on criterion code
    - retrieve the message from the list
    - display the message on the screen for a predetermined time
    - update account record
    - remove hold of initiation of text messaging
    - let the entering of the text message be completed
    - search list 74 to find a commercial message based on criterion code
    - integrate the message in the body of the text message
    - update account record
    - let the text message be sent from device 12
  Incoming text message 32B
    - sense initiation of text message retrieval on device 12
    - delay/hold initiation
    - search list 74 to find a commercial message based on criterion code
    - retrieve message from list
    - display the message on the screen for a predetermined time
    - update account record
    - remove hold of initiation of text message retrieval.

Figure 4A

Voice communication 34

Outgoing Voice Communication 34A
- sense initiation of voice communication on device 12
- delay/hold initiation
- search list 74 to find a message based on criterion code
- retrieve message
- display the message on the screen
- update account record
- let dialing out resume for voice communication
- search list 74 to find message based on criterion code
- integrate the audio message during the communication
  - use distinctive tone to begin and end message
- update account record
- repeat, with a different message if the voice communication exceeds 3 minutes Incoming Voice Communication 34B
- sense initiation of voice communication on device 12
- delay/hold initiation
- search list 74 to find a message based on criterion code
- retrieve message
- display the message on the screen
- update account record
- let phone pick up resume for voice communication
- search list 74 to find message based on criterion code
- integrate the audio message during the communication
- update account record

Figure 4B

At step 130, using a handheld wireless device for wireless communication.
At step 132, receiving inbound wireless data from a message server
At step 134, storing message file from message server in the device memory.
At step 135, selecting the device 12 use mode as message exposure.
At step 136, initiating or receiving a communication by the device user
At step 138, exposing the stored messages to the user before device use.
At step 140, limiting the number of messages so exposed.
At step 142, integrating the stored messages with the communication of the user.
At step 144, communicating device location to the message server
At step 146, enabling the message server to send messages specific to a location.
At step 148, billing zero fees to the user for communication services in return for being exposed to commercial messages.
At step 150, charging one time charge to the user based on the type of the device that is selected by the user.
At step 152, identifying the messages in the message server to message providers and tracking the messages in the server.
At step 154, storing messages in the message server that are time tagged and are sent and refreshed periodically in to the device.
At step 156, tracking which messages have been displayed, number of times and sending an account record to the message server the device has a message tracking function.
At step 158, receiving account records by the message server and storing them in the server
At step 160, using cumulative account records to create billing statements to the message providers.
At step 162, limiting the messages duration to create an mental impression.
At step 164, making the message may be flash motion;
At step 166, embedding the message may be embedded in surrounding space;
At step 168, embedding the message may embed a mini-game with point scores.

Figure 5B

At step 110, planning and designing an advertising campaign using the wireless device message delivery format.

At step 112, deciding, by the message provider, the message format types and providing a corresponding message file in a web interface to the message server.

At step 114, deciding by the message provider, on the message delivery demographics, the number of deliveries, and the time period of delivery; for exposing the message to the wireless device user during the wireless device use.

At step, 116, activating the campaign by paying for the campaign via a payment method.

At step 118, collecting status for message exposure to wireless devices from the message server.

At step 120, refining the campaign by changing the message type, delivery method, demographics and delivery period.

Figure 6A

SYSTEMS AND METHODS FOR MOBILE WIRELESS ADVERTISING PLATFORM PART 1

CROSS REFERENCE TO RELATED APPLICATIONS

This application claims priority on Provisional Application Ser. No. 61/126,345, entitled "Systems and Method for Mobile Wireless Advertising Platform" filed on May 3, 2008, by Tara Chand Singhal. The contents of Provisional Application Ser. No. 61/126,345 are incorporated herein by reference.

This application claims priority on Provisional Application Ser. No. 61/132,662, entitled "Systems and Methods for Mobile Wireless Advertising Platform" filed on Jun. 20, 2008, by Tara Chand Singhal. The contents of Provisional Application Ser. No. 61/132,662 are incorporated herein by reference.

FIELD OF THE INVENTION

The embodiment are directed to systems and methods for a mobile wireless advertising platform that enables commercial message providers to implement a mobile wireless device based advertising campaign and for the mobile wireless device users to be exposed to such commercial messages.

BACKGROUND

Advertisers have used and currently use advertising channels such as print, radio and television. With the advent of Internet and computers, the Internet has begun to play a bigger role in peoples' lives for work and leisure. Newer channels of advertising that use Internet web pages in the form of banner ads embedded on the margins of a web page and display ads that are overlaid over the web-page content are being used. Free services such as search engines, among others, display commercials in the search results. These newer forms of advertising channels have become far more prevalent in the last ten years and have come to be used by the advertisers in addition to the traditional channels for print, radio and television.

The above conclusion is also borne out by a report titled "The End of Advertising As We Know It", a 2007 report authored by Dr. Saul J. Berman, and Bill Battino of IBM Institute for Business Value, IBM Global Business Services. http://www-03.ibm.com/industries/media/doc/content/resource/business/2898468111.html. From this report, "The next 5 years will hold more changes for the advertising industry than the previous 50 years did. Increasingly empowered consumers, more self-reliant advertisers and ever-evolving technologies are redefining how advertising is sold, created, consumed and tracked."

The mobile wireless device also known as cellular phones or mobile phones, usage, as evidenced by the number of cell phones in use every year, is growing rapidly. New application on these wireless devices and improvements in the speed of new generation wireless networks have also been factors in the growing use of the cell phones. Based on one statistic from the cell phone industry, there are now over 260 million cell phone subscribers in the US alone.

Many in the advertising industry have come to realize that cell phones would make an ideal additional channel of advertising. Companies such as Google who have a dominant stake in the search business on personal computers are interested in transporting and moving the same approach to the cell phones, but are uncertain of the practicality of sending banner ads on the tiny cell phone screens as well as negative consumer reaction. A wireless device is a personal item and users would not want the wireless device to be inundated with commercials. This would likely invite a backlash against providing the cell phones as an advertising medium like the internet searches and banner ads on personal computers.

Also, from a news item, titled, "USA Lags On Cell Phones' Marketing Potential", by Theresa Howard, USA TODAY Thu Jun. 19, 2008, "Advertisers are working hard to master mobile, not least because its potential as a medium far outstrips the Web on PCs. Mobile tops 3 billion users worldwide, while PC use is at 1.2 billion, and each of the increasingly Web-enabled digital handsets is a personal connection to an individual."

In the future, it is believed, wireless mobile devices will play an even bigger role in the peoples' lives and thus would form an attractive channel for delivery of commercial messages if it is done in a way that balances the interests of the cell phone user and the advertiser.

In light of the above, it is an objective of the embodiments herein, to provide newer forms and formats of commercial messages that would integrate with wireless mobile device use.

In light of the above, it is also an objective of the embodiments to provide different and improved systems and methods for commercial advertising via wireless mobile device means.

In light of the above, it is also an objective of the embodiments to provide improved systems and methods for advertisers to target commercial messages and collect exposure data, for them to tailor their advertising campaigns, using cell phones as an advertising medium.

SUMMARY

A wireless mobile communication device such as a cell phone may generally have different categories of functions such as, functions that use a wireless communication network provided by a telephone company (Telco) and functions that do not use the wireless communication network. The functions that use the wireless communication network include, telephone, e-mail, text messaging, request for information and download of data files. The functions that do not use the wireless communication network include music, camera, games, and personal digital assistant.

One embodiment of mobile advertising platform uses these communication functions of the mobile device. In this embodiment, a message server sends a message file over the wireless communication network and the device receives and locally stores is the message file, containing a one or more of commercial messages. The file may be sent periodically such as every 24 hours or less or more often. Types of message formats in the message file may be, text, audio, image, animation or interactive.

These locally stored messages in the message file in the wireless device are exposed to the device owner, whenever the device owner uses the communication functions of the device as delineated above. Whenever the device owner sends or receives voice telephone, text or e-mail, or request for service, the sending/receiving function is temporarily delayed for a very short time until a selected message according to a preprogrammed criterion from the message file is exposed to the device user. In addition to this type of exposure, before being allowed the use of the communication function, the message exposure may include embedding the message in the communication itself.

The system and methods of this embodiment provide in the wireless device, (i) an inbound wireless data function, (ii) a storage function to be able to receive and locally stores, audio, text, and image-based commercial messages from a message server, (iii) and a function that integrates these messages from the stored memory of the device into the incoming and outgoing communication to and from the user. The number of messages, so integrated, in a single communication, may be limited in number and duration, not to exceed a threshold. The message may be audio, text, image, or animation. The message may be interactive and the message may also be a coupon format.

In this embodiment, the communication usage cost of the wireless device is offset from revenue generated from message providers for displaying their messages to the user. There is no billing for communication services to the user in return for being exposed and displayed messages before being permitted to use or continue to use the communication function in the wireless device.

A second embodiment of mobile advertising platform uses the non-communication functions of the mobile device. In this embodiment, a message server also sends a message file over the wireless communication network and the device receives and locally stores the message file, containing a one or more of commercial messages. The file may be sent periodically such as every 24 hours or less or more often. Types of message formats in the message file may be, text, audio, image, animation or interactive.

These locally stored messages in the message file are exposed to the device owner, whenever the device owner uses the non-communication functions of the device as delineated above. Whenever the device owner uses music, game, camera or other non-communication functions, the activation of these functions is temporarily delayed for a very short time until a selected message according to a preprogrammed criterion from the message file is exposed to the device user.

The system and methods of this embodiment provide in the wireless device, (i) an inbound wireless data function, (ii) a storage function to be able to receive and locally store, audio, text, and image based commercial messages from a message server, (iii) and a function that integrates these messages from the stored memory of the device into the wireless device functions such as music, camera, personal digital assistant. The number of messages may be limited in number and duration, not to exceed a threshold. The message may be audio, text, image, or animation. The message may be interactive and the message may also be a coupon format.

In this embodiment, the cost of the wireless device is offset from revenue generated from message providers for displaying their messages to the user. Therefore the device can be provided free of cost to the device user.

These embodiments of a system of the wireless advertising platform have a wireless device and a commercial message server, and use a currently utilized or a future developed wireless network that is provided by Telco companies such as AT&T, Verizon, Sprint, and other companies.

In these embodiments, the wireless device may also have a message tracking function that tracks which messages have been exposed to the user and periodically sends an account record to the message server. The message exposure tracking function in the device tracks and records what messages have been exposed as described above, and sends such a tracking record to the message server periodically, such as every 24 hours or less or more often.

The message server has secure interfaces to the wireless device to be able to push a file with commercial messages and pull the account record of the exposed messages from each wireless device. The message server uses cumulative account records to create statistical and billing statements to the message providers.

The wireless device may also have service functions that work in conjunction with a service server. A service function may be a directory function that provides a telephone number and or address from a service server. Another service function the wireless device may have is an almanac function that is able to input a category and an item in the category and provides information associated with the item from the category from the service server, to the device user. When the service information is displayed, commercial messages that are stored in the device may be displayed along with the service information.

In a third embodiment, the message server has a message provider interface. The message provider interface is used to create and maintain an account with the message server; to plan and design an advertising campaign and to enter commercial messages for exposure to wireless device users; to measure the delivery and response thereof of the messages to the device users by device identifier, and to refine the advertising campaigns in order to enable them to provide more effective advertising campaigns using this channel of mobile wireless device advertising platform.

BRIEF DESCRIPTION OF THE DRAWINGS

The novel features of one or more embodiments, both as to their structure and operation, will be best understood from the accompanying drawings, taken in conjunction with the accompanying description, in which similar reference characters refer to similar parts.

FIG. 4A is a method diagram that illustrates a version of one embodiment of the mobile device ad platform for the device message function.

FIG. 4B is a method diagram that illustrates a version of one embodiment of the mobile device ad platform for the device message function.

FIG. 5B is a flow diagram of one embodiment.

FIG. 6A is a method diagram that illustrates a version of one embodiment of the message provider interface.

DESCRIPTION

Introduction

Figure 1A:
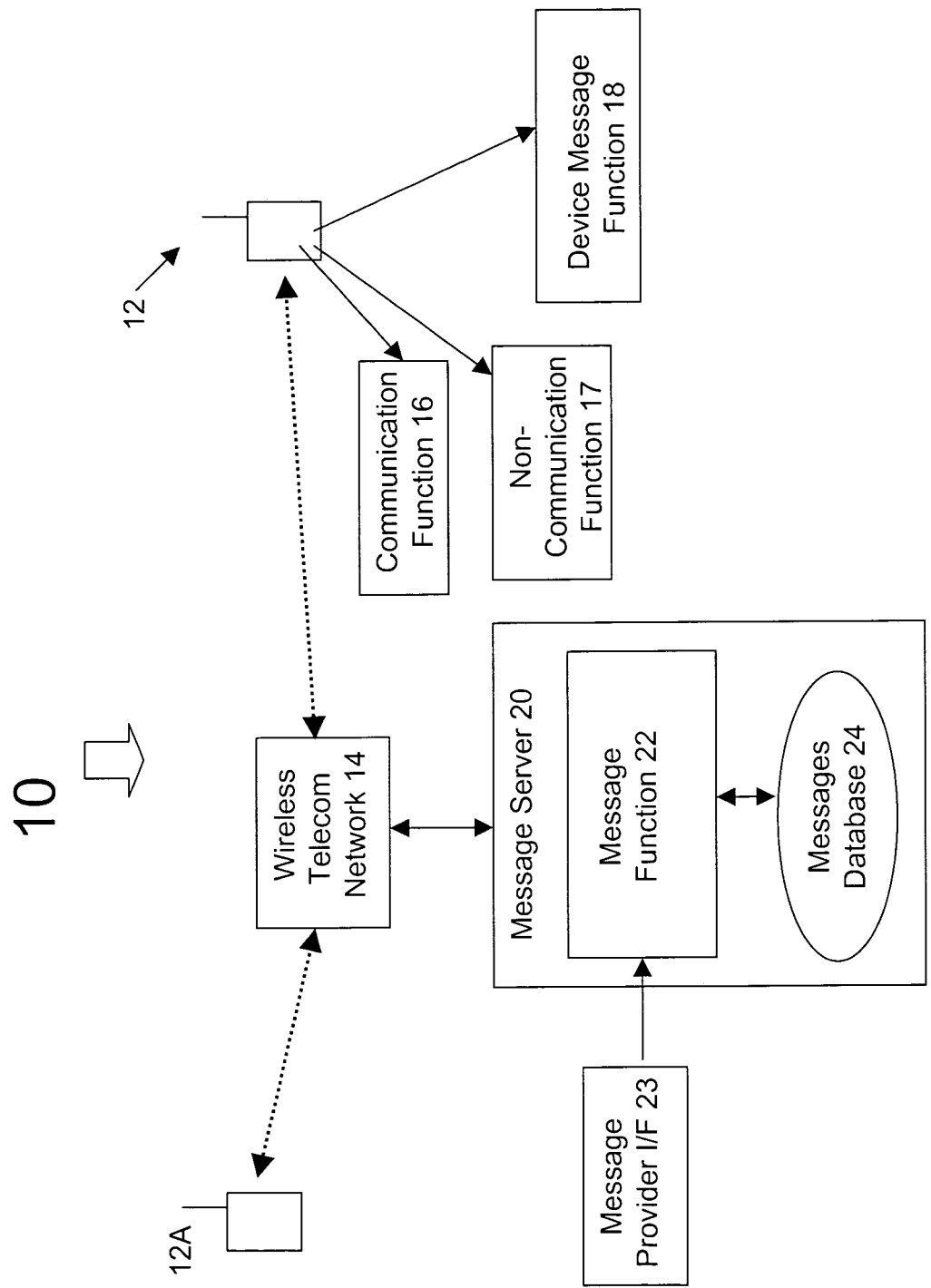
FIG. 1A is a block diagram that illustrates a version of one embodiment of the mobile device ad platform.

With reference to FIG. 1A, a system 10 of wireless advertising platform has a handheld wireless device 12, a message server 20 hosting and executing a message server function 22 with a message database 24 working with a currently utilized or a future developed wireless network 14 that enables communication between wireless devices 12 and 12A and between the device 12 and the message server 20.

The device 12 is a currently utilized or a future developed communication device that has a currently utilized or a future developed wireless communication function 16 to send and receive voice, text message and e-mail communication to and from a device user's selected sources and destinations via wireless device 12A. The device 12 has a device message function 18. In one embodiment, the device message function 18 integrates commercial messages that are stored in the memory of the device 12, with the incoming and outgoing communication via the communication function 16. In another embodiment, the device message function 18 integrates commercial messages that are stored in the memory of the device 12, with the use of the non-communication functions 17 of the device 12.

The commercial messages stored in the memory of the device 12 have been sent into the device 12 by the message server function 22 from the messages stored in the message database 24 via the network 14. The device 12A with which the device 12 chooses to communicate need not have the device message function 18.

The message server function 22 in the message server 20 is able to receive commercial messages from message providers (not shown) via a message provider interface 23, described later with reference to FIGS. 6A-B, and store these messages in the message database 24. The commercial messages may be in any number of non-exclusive formats that may include, audio, text, images, animation, mini-game or a combination thereof, as illustrated later with reference to FIG. 5A.

The message server function 22 sends these messages to the device 12. In alternative, non-exclusive examples, the message server function 22 can send these messages to the device 12 in intervals of approximately 1 hour, 2 hour, 4 hour, 8 hour, 12 hours, one day, seven days, 30 days, or sixty days or ninety days, where the device message function 18 stores them in the storage of the device 12. In certain embodiments, it may be determined that they may be sent to the device 12, as often as once every 24 hours or once every month, based on the usage or consumption of the messages by exposure to the device 12 user. Some device users may be heavy users of the device 12, thereby being exposed to and consuming these messages faster than those who may not use the device as often or use it occasionally. They may be sent less often or more often and may be sent in off-peak times such as in the night to better is utilize the network capacity.

Figure 1B:
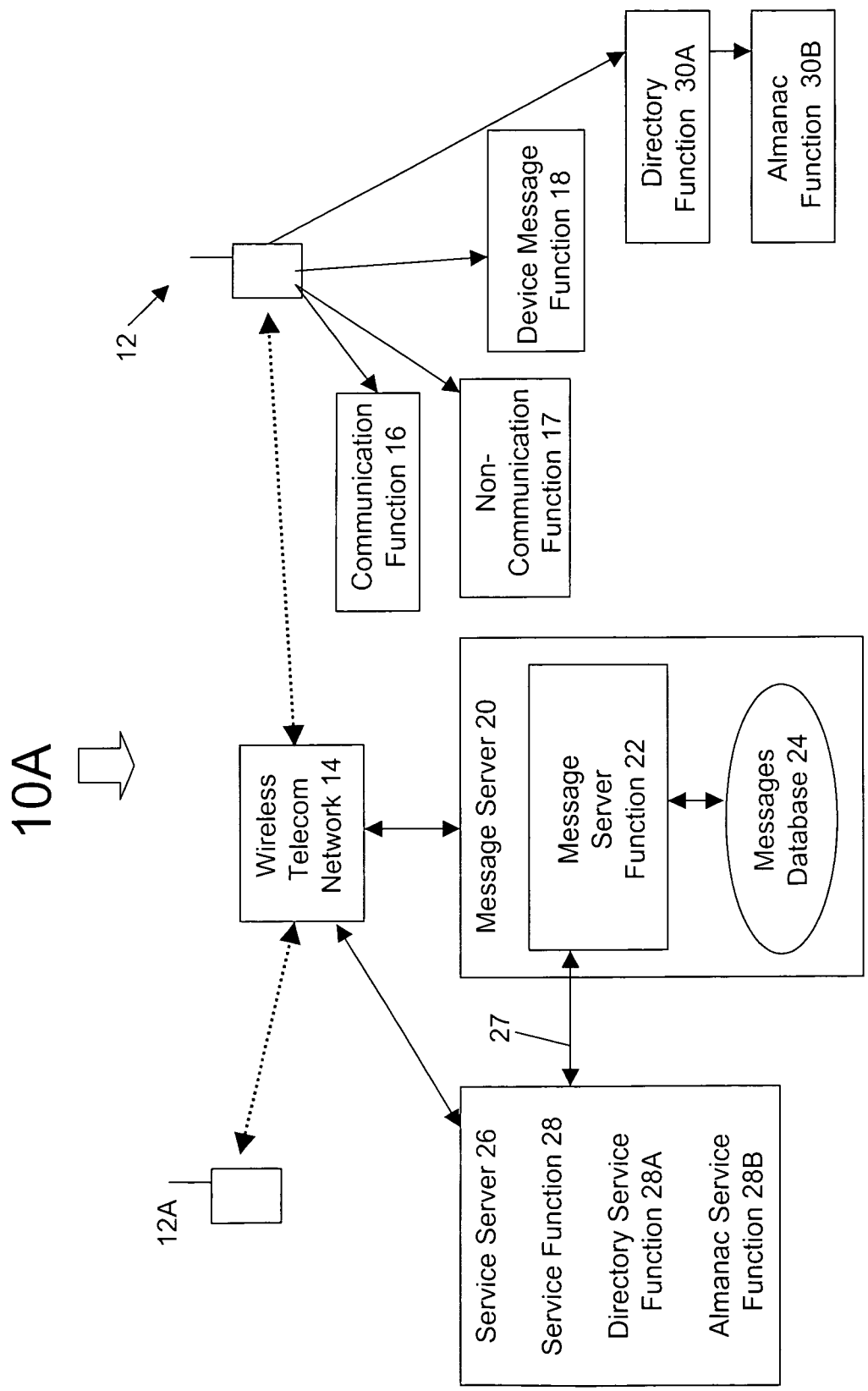
FIG. 1B is a block diagram that illustrates a version of one embodiment of the mobile device ad platform that uses an information function.

With reference to FIG. 1B, a system 10A of wireless advertising platform is same as system 10 as described with reference to FIG. 1A, with the addition of a service server 26, with a service function 28 that provides directory service function 28A and almanac service function 28B. The device 12 has a directory function 30A and an almanac function 30B The directory service function 28A may receive directory request from device 12 via network 14, search the directory and send the directory response to device 12 in response to the directory request. Optionally, in the service server 26, there may be a send message request to message server 20 and in response receive message from the message server 20. The service function 28 would embed the message in the directory response before sending the directory response to the device 12. As a simplified illustration, the message may be "The service is brought to you by company x, brand y." The message server 20 would track by device id, to which device 12 the message has been delivered.

The directory device function 30A in the device 12 has a user interface that may be voice or text input-based for inputting a directory request, a function to send the directory input to the service server 26 via network 14, and a function to receive a response from the service server 26. The directory device function 30A may also work with the device message function 18 to retrieve one or more stored messages from the device storage, display and integrate these messages into the directory response and display to the user or voice deliver based on the type of interface used by the user.

The almanac service function 28B receives an almanac request from device 12 via network 14, searches the almanac database and sends an almanac response to the device 12. Optionally, in the service server 26, there may be a send message request to message server 20 and in response receive message from the message server 20. The service function 28 would embed the message in the almanac response before sending the almanac response to the device 12. As a simplified illustration, the message may be "The information that you requested has been brought to you by courtesy of business X."

The almanac device function 30B has a user interface that may be voice or text input based for inputting an almanac information request, a function to send to the service server 26 and a function to receive a response from the service server 26. The device almanac function 30B may work with the device message function 18 to retrieve one or more stored messages from the device storage, display and integrate these messages into the almanac response and display to the user or voice deliver based on the type of input.

As described later in the specification, in the device 12, there is an account function that keeps track of what messages, from the message file, have been used up by being exposed to the device 12 user, and periodically sends an account record to the message server 20.

Device 12

Device 12 is a currently utilized or a future developed wireless device that has the features of the embodiments described in the present invention. Currently utilized wireless devices provide for many brands of wireless devices from many manufacturers and telecom service providers with various features and in wide range of prices. These currently utilized wireless devices, in addition to the basic communication function, provide plenty of processing power and memory that may be used to host any number of custom applications. Any of these currently utilized or future developed devices may be custom adapted to provide the features of one or more embodiments as described in this specification.

Message and Service Servers 20 and 26

Message server 20 and service server 26 are currently utilized servers equipped with features as described in the embodiments. The servers have one or more CPUs, memory, and storage devices and are capable of high volume searches and handling high volume of interfaces from the device 12 via the network 14 via currently utilized or a future developed network protocols.

Message server 20 has an interface to the wireless network 14 for communicating to the device 12. This interface is used for periodically sending messages to the device 12 to be stored in the local storage of the device 12. This interface is also used for receiving message exposure account record from device 12 to the message server 20. The technology that is used in such interfaces is prior art. The message server 20 also has a message provider interface 23, as illustrated in FIG. 1A, for message providers to be able to open an account and enter commercial messages in the message server 20 and to be sent billing statements. The technology itself for such interfaces is prior art.

The service server 26 has an interface to the wireless network 14 for communicating to the device 12. This interface is used on an as needed basis to respond to service requests from the device 12. The technology that is used in such interfaces is prior art. The service server 26 also has an optional interface 27 with the message server 20. The technology itself for such interfaces is also prior art.

There may be multiple message servers 20 that may be distributed geographically and managed by a master message server to serve wireless devices 12 in different geographic areas, and to perform backup, maintenance functions and load balancing functions to handle a large number of wireless devices that may number in tens of millions.

Message Database 24

Message database 24 is a relational database management system common in prior art that is designed and adapted to handle the functions and tasks of the embodiments herein. There are many databases that may be maintained in the database system 24, based on the functions of the embodiments as described later in the specification.

Device Message Function 18

The device message function 18 integrates the commercial messages from the message file stored in the device 12, into the incoming and outgoing communication to and from the user of the device 12. The device message function 18 in the device 12 integrates these messages stored in the memory of the device 12 to the user before the user can initiate or receive a communication and may also integrate these messages during the communication itself. Different methods of integrating these messages are described later in this specification. The number of messages so integrated may be limited in number and duration not to exceed a threshold.

The device message function 18 in the device 12 includes the functions, (i) that enable the device 12 to receive messages from the message server 20, (ii) store these messages in the device's local storage, (iii) select messages from the local storage according to a criterion code that is part of the message upon use of the device 12 for communication, (iv) display and integrate these messages within the communication either before and/or during the communication, (v) use an account function to create an account record identifying what messages have been so used up in the communication by being displayed or exposed to the user, and (vi) periodically send that account record to the message server 20 via the wireless network 14. In one embodiment, the device message function 18 may expose the commercial messages from the message file to the device user while using non-communication functions 17 of the device 12.

Message Server Function 22

The message server function 22, operable in the message server 20 supports functions that include, (i) enable message providers to sign up and enter messages into the message server; (ii) create and track message attributes, (iii) be able to store these messages in the message database 24 by these attributes, (iv) periodically send these messages to the devices 12, (v) periodically receive from devices 12, an account record identifying the time and frequency of messages that have been exposed to the device user, (vi), store these account records in the message database 24, and (vii) use such records to create billing statements for the message providers. The message attributes may include attributes such as audio, text, flash/visual animation, preferred geographic area, language, and demographics by age and gender. There may be other attributes as well such as, interactivity, message duration and criterion code as described later in the specification.

Device 12 Communication and Messaging Service

As non-exclusive example, the communication usage cost for the device 12 for both the communication function 16 and use of the device to periodically communicate with the message server 20 and communicate on as needed basis with the service server 26 may be rebated approximately 10%, 25%, 50%, 75%, 90% or 100% from revenue from the message providers for the service of exposing and integrating messages to the device users during and/or before the communication use of the device 12. Hence, there may not be billing to the device 12 users for communication services in return for being exposed to messages before being permitted to use the communication function 16 in the device. In this embodiment, the device 12 may have a onetime charge to the user based on the type of the device that is selected by the user to offset the cost of the device 12.

The communication service that is provided to the device 12 may be contracted from a single telecom service provider, where the devices 12 may be distributed by that provider or they may be contracted from more than one service provider. The telecom service provider may be contracted for bulk service to be used by the users as a large group and may be favorably rated due to the large size of group. Alternatively, or in addition, the telecom service provider may share from the revenue earned from the message providers. As each communication may have one or more than one message integrated within it, the revenue per message from longer communications such as voice calls may be higher than from the shorter communications which use less network resources.

Interface between Device 12 and Message Server 20

The sending of commercial messages to the device 12 from the message server 20 may be done via any number of currently utilized or a future developed technologies. For example, the device 12 may initiate a communication connection with the message server 20, using currently utilized or a future developed communication and security protocols. Alternatively, the message server 20 may initiate such communication connection to the device 12 using currently utilized or a future developed communication and security protocols. The security protocols provide for mutual identification and authentication between the device 12 and the message server 20 and encryption of the communication channel using Public Key Infrastructure (PKI) and pre-placed digital signatures and keys.

Based on the commercial message formats as described later, the size of each message may be in the range of a few kilobytes to as much as 25 Kbytes. A number of such messages are included in a message file. The number of messages in the file may be as few as 10 or as many as 1000. Therefore the size of the message file may be limited to as much as 250 Kbytes to 2.5 Megabytes. The number of messages in a message file and thus the size of the message file may be shorter or longer depending upon how often messages are used by exposure and refreshed from the message server. As an example, if the message list is refreshed every day or every week, the message file size may be relatively shorter than if the message file is refreshed every few months. The speed of the wireless networks and the size of the memory that is usually available in the modern wireless devices do not present any issues regarding the sending of the message file from the message server 20 to each device 12. The device 12 may be a custom device that is sized to handle message files of different sizes. Moreover, the message file may be sent in off-peak hours of the network 14 usages, such as between midnight and 4 AM.

Message Exposure to Device 12 User

There are different approaches and methods with which the messages from messages providers may be exposed to the device 12 users. Such methods may be different for voice calls and text messages and may be different for incoming and outgoing communications. One method for outgoing voice communication would be to put on hold the ability to dial and connect, until the message is displayed on the screen or is voice delivered to the user. Another method for outgoing voice communication would be to interrupt the ongoing voice communication for short periods of times to overlay an audio message.

A method for incoming voice communication would be to put on hold the ability to pick up and connect, until the message is displayed on the screen or is audio exposed to the user.

A method for outgoing text message communication would be to put on hold the ability to key in the text message, until the commercial message is displayed on the screen. Another method for outgoing text message communication would be to add to the keyed in text message a commercial message in the beginning, at the end of the text message, or both in the beginning and at the end of the text message.

A method for incoming text message communication, would be to put on hold the ability to read the text message, until the commercial messages are displayed on the screen to the user. Similar methods of exposure may be applicable to other forms of communication such as e-mail and data download as part of request for service. Similar methods of exposure may be applicable to the non-communication functions 17. Any other method of integrating and exposing the commercial messages stored in the local storage of the wireless device may be used and are not ruled out.

The messages that are integrated with the incoming and outgoing communications may be limited in length for each communication as well as in total for multiple messages in each communication to create a balance between the quality of communication service to the users that may be cost free and the revenue that would be generated from the message providers. In one non-exclusive embodiment, it is believed that on average, 6 to 9 seconds of a commercial message per 60 seconds of voice communication and one commercial message for each SMS text message may be a judicious balance. That would approximate from 10-15% of the communication resource being used for commercial messages. For example, if the voice communication lasts for 5 minutes, a 10% message use would allow for 30 seconds of messages. That 30 seconds message space may be used for either a single or multiple messages. For example, as an illustration, multiple messages of 6 second each may be spread over the five minutes of call duration. For each call, there would generally be two parties, even though the device 12 may be used by only one of the users to the communication, as device 12A may not have these features.

Based on experience in other media that is used for commercial message such as radio and television, in one non-exclusive example, 10% to 15% of the time devoted to commercial messages is normally expected by the listening and viewing audience, in return for enjoying free use of the broadcasts.

The device message function 18 is integrated with the communication function 16 to be able to put on hold, and delay the communication until the messages are exposed to the user, as well as to integrate the message in the middle of the communication.

The technology itself for integrating messages with the communication either before it is initiated or during the communication itself is prior art and the technology itself to add and or mix the message file with the communication is prior art.

The mobile wireless device or cell phones are general purpose computing devices with CPU, memory and non-volatile storage and are thus software-based devices, where the software controls all aspects of operation of all functions in the device. As an illustration, of the ability of the embedded software to control and provide and overlay many different functions in a cell phone, a company called TSH Software House, based in Manchester, United Kingdom, http://www.thespyphone.com/ sells a spy phone software package for GSM phones that has access to a phone's core features, enabling the spy software to intercept calls, intercept SMS, track the device, does not require any active internet connections, works in any country, among many other features advertised on their website.

Databases 24

Figure 2A:
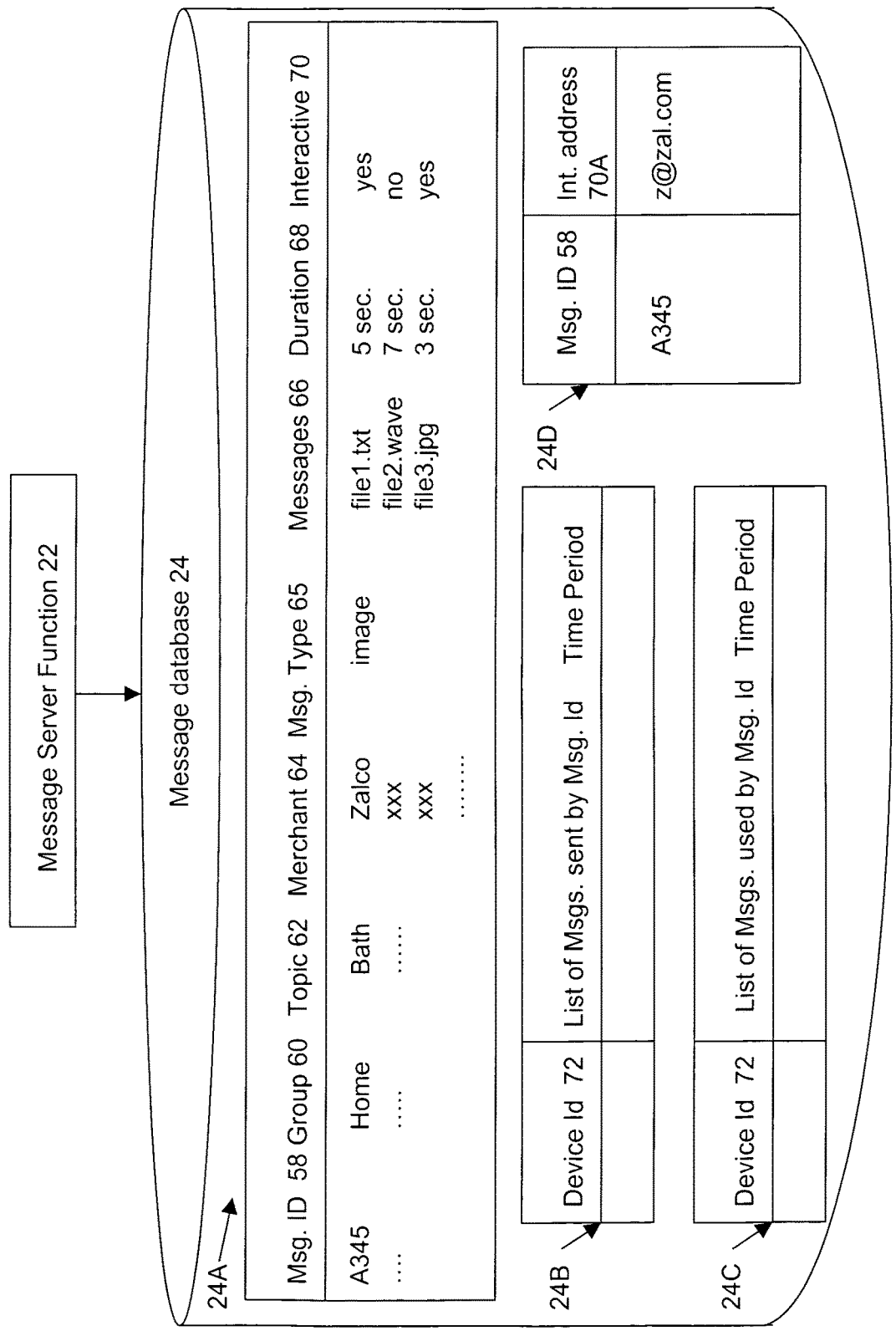
FIG. 2A is a block diagram that illustrates a version of one embodiment of the mobile device ad platform for the message server function.

With reference to FIG. 2A, there may be multiple databases within database 24. Database 24A may be used for storing messages and their attributes, where each message is identified by a message ID 58. Database 24B may be used for storing device ID 72 and the list of messages that are individually assigned to each device 12. Database 24C, may be used to store the list of messages that have exposed to the device 12 user by device ID 72.

Additional databases (not shown) may also be used to support message provider interface 23, such as planning an advertising campaign and billing services. Message database 24D is used to identify those messages that have an interactive address 70A for the message provider to implement interactivity for interactive messages that are exposed to the device 12 user as described later in the specification. Not all messages in the database 24A are expected or would have message interactivity feature.

Additional databases (not shown) may also be used to support message server 20 interfaces with device 12. Such databases may have device account information to include, name, address, telephone number of device identifier, device machine identifier, demographics information, and encryption keys that may be used to support the wireless device interface.

The message server function 22 stores messages in the message database 24A that are identified to associate with message providers or merchants 64. The function 22 creates and assigns a message id tracking number 58 for tracking the messages in the database 24A. The message server 20 stores messages 66, in database 24A that are categorized by the topic 62, group 60, and message type 65, message duration 68, and interactive feature 70. Further more, the messages may be time tagged, sent and are refreshed periodically into the device 12 with the help of device id account database 24B and 24C. The device account database 24B identifies each device by device-id 72 in the database 24B. For each device id 72, a list of messages sent, a list of messages used and period over which they are used, based on account record returned from the device 12, is maintained in databases 24B and 24C.

Figure 2B:
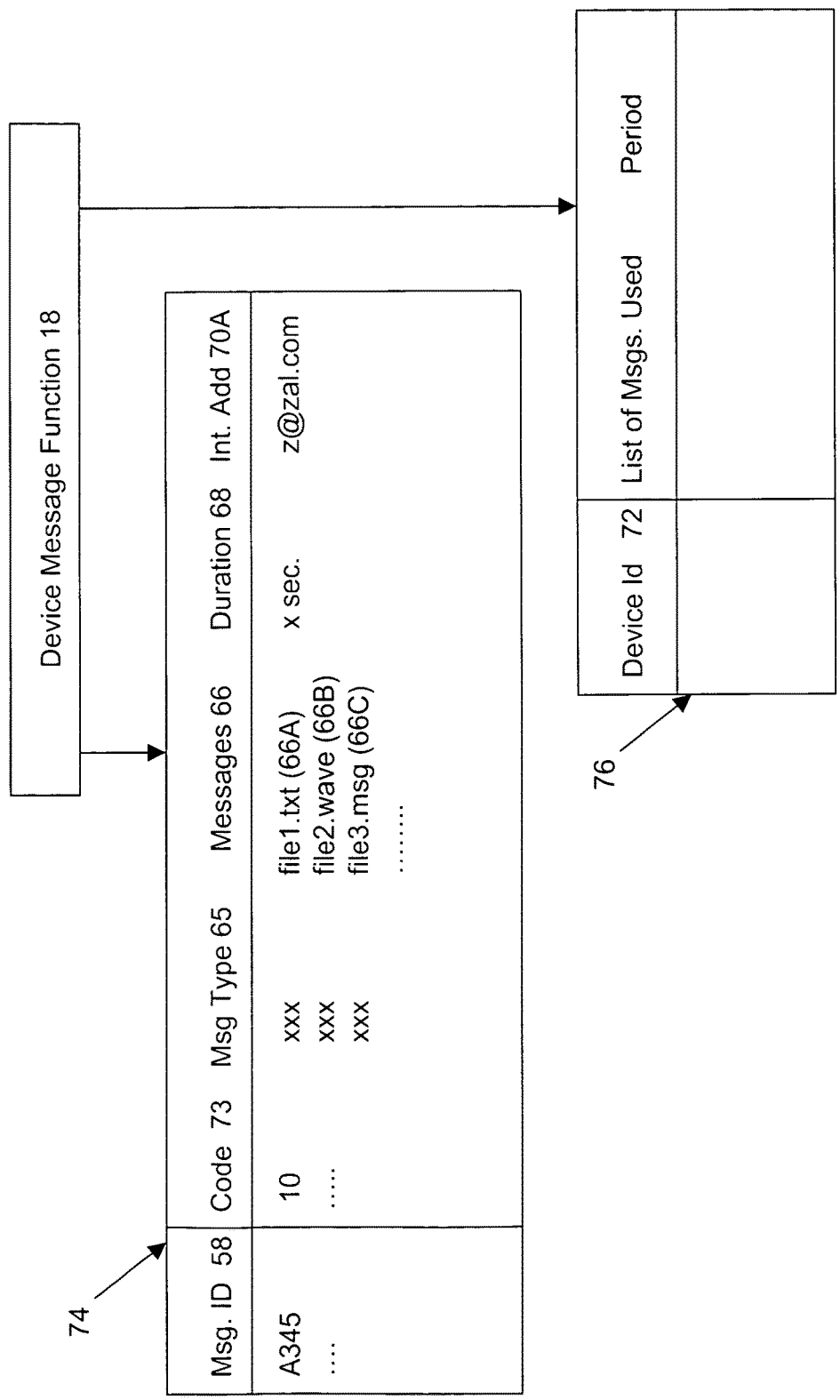
FIG. 2B is a block diagram of functions that illustrates a version of one embodiment of the mobile ad platform for the device message function.

With reference to FIG. 2B, the device message function 18, operable in the device 12, stores messages in a message list 74 in the device 12's local storage. The messages that are received from the message sever 20 are stored by the attributes of msg. id 58, criterion code 73, type 65, the message file 66, message duration 68, and interactive URL address 70A. Whenever the device 12 is used, the device message function 18 selects messages from this list 74 in the local storage according to the preprogrammed criterion code 73 for message selection and integrates with the communication.

The criterion code 73 may be used to identify different approaches or algorithms that may be used to expose different formats and types of messages to the user in the device 12. As a simplified illustration, a criterion code may indicate that this message is to be exposed 10 times over one month and should be exposed only for outgoing text messages. Another criterion code, may be, that the voice message is to be integrated with a voice communication during the communication itself and may be broken in as much as three parts. Another criterion code may be that the flash message may be displayed up to five times over five days, only for service functions. There may be a criterion code that is associated with each message, and may be appropriately priced to the message provider, the criterion code may be selected by the message provider at the time of placing a message in the message server via message provider interface 23 to the message server 20.

The device 12 has a currently utilized or a future developed location capability by virtue of it being a wireless device. The location capability may be the cell location captured by cell towers. This location information may be communicated by the network's telecom service provider, to the message server 20, enabling the server 20 to send messages that are specific to a geographic location, where the device 12 user is based.

Alternatively, in a non-exclusive embodiment, in a GPS enabled device 12, the device 12 may communicate the device 12's geographic location to the message server 20. Alternatively, in a non-exclusive embodiment, the postal zip code, where the device was obtained and the area code of the telephone number assigned to the device 12 may also be used for selecting geographic specific messages in the message server for delivery to the device 12. For example, if the device is based in Southern California, there is no need to send messages to the device 12 that are specific to message providers (merchants) that are based in Northern California or another geographic region.

The device message function 18 records or keeps an account of each message that is selected and used from the message list 74 and stores in an account record 76 that identifies the device id 72, list of message used from this list 74, and the period over which they were used. The account record 76 is sent periodically to the message server 20.

Hence, the device 12 has a message tracking function that tracks which messages from message file 74 have been exposed and how many times and periodically sends an account record 76 to the message server 20. The message server 20 receives the account records and stores them in the server in database 24C and uses cumulative account records to create billing statements to the message providers.

The messages may be of any number of different formats that are currently utilized or may be developed in the future. As an example, they may be types of audio, image, and text. If the message is an image, the image messages duration may be limited to be a few seconds or even sub-second duration to create a mental impression. The message may be flash motion images and may be embedded in surrounding screen space of device 12. The message may embed a mini-game with point scores. The technology for creating such messages is prior art.

Message Server Function 22

Figures 3A, 3B:
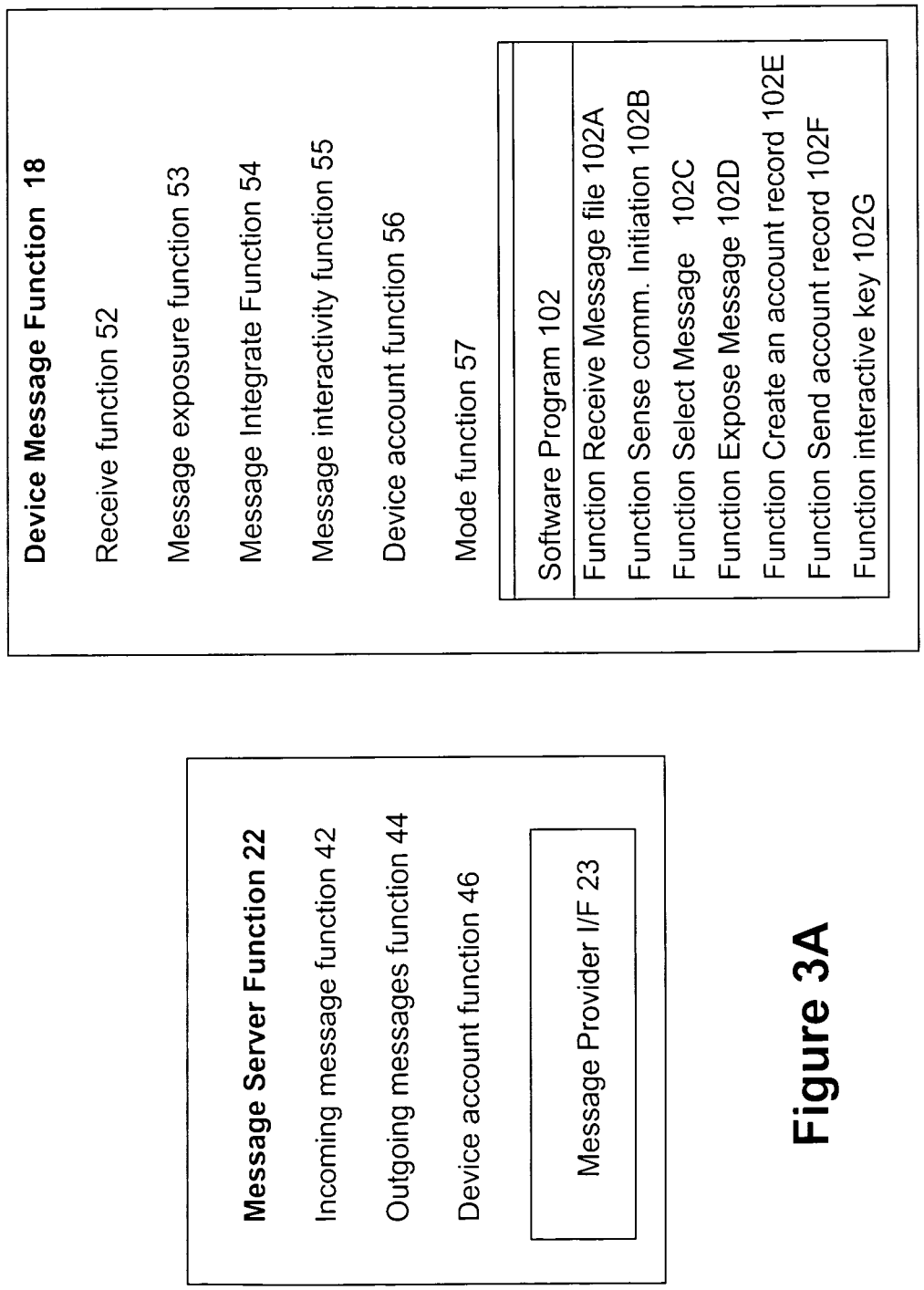
FIG. 3A is a block diagram that illustrates a version of one embodiment of the mobile device ad platform for the message server function.
FIG. 3B is a block diagram of functions that illustrates a version of one embodiment of the mobile ad platform for the device message function.

With reference to FIG. 3A, the message server function 22 manages the messages in the server 20 and includes the following sub-functions:

Incoming message function 42 allows the message providers to enter messages and select a message distribution profile. The messages that may be entered may be audio messages in the form of wave or MP3 files, images in the form of flash, interactive images, text messages, musical phrases, product coupons, and mini-games. The function 22 creates and track message attributes and stores these messages in the message database 24A by these attributes.

Outgoing message function 44 manages the delivery of the messages to the wireless devices 12 by device id. The messages are selected and sent to devices periodically such as every 24 hours or every month or more or less often based on message exposure rate. The messages may be updated to the devices as often as 24 hours or as often as every month. The messages are periodically sent to the devices 12, preferably in off-peak periods. This function manages per device 12, what messages have been sent, and to send those messages that have not been sent in a given time period. This function also manages the device owner profile and to select messages for the device that match the device owner profile and the message provider's message target profile.

The Device account function 46 receives from each device 12 an accounting of what messages remain unused and what messages have been used/displayed to the device user, including their frequency and time. The function 46 periodically receives from devices 12, an account record identifying the time and frequency of messages that have been exposed to the device user, stores these account records in the message database 24C, and uses this account record to create periodic billing to the message providers, along with use/display statistics.

The message provider interface 23, as illustrated in FIG. 1A, that facilitates the incoming message function 42, is described later with reference to FIGS. 6A-B.

Device Message Function 18

With reference to FIG. 3B, the device message function 18 manages the commercial messages in the device 12 and has the following sub-functions.

A receive sub-function 52 receives commercial messages from the message server 20 in the form of a message file and stores these messages in the device's local storage. The message file may be customized to the particulars of a specific device 12 based on device 12 owner demographics that are maintained in the database 24. The message file may be further customized based on device 12 users' device feature use pattern. The device 12's use pattern may be collected as part of the device account sub-function 56, described later. The use pattern may include type, frequency and length of use of the different features and function of the device 12 enabling the message server to include in the message file those commercial message format that are more applicable to the device use pattern. As a simplified illustration, if the device 12 user is a heavy voice communication user and not a text message user, then the message file would only have audio type commercial messages and not text type commercial messages.

A message exposure sub-function 53 exposes one or more messages from the message file in the device 12 to the device 12 user on using the device 12's communication functions 16 and non-communications functions 17, as illustrated earlier with reference to FIG. 1A.

A message integrate sub-function 54 integrates the messages from the message file with incoming and outgoing communications by selecting messages from the local storage according to a criterion code that is part of the message and displays and integrates these messages within the communication either before and/or during the communication.

The communication may be via voice or text messaging. The communication may also include e-mail format, which is treated similar to a text messaging system. The integration may be done differently for outgoing voice and incoming voice and for outgoing text and incoming text. The integration may be done by placing the message at the beginning of the communication or at the end of the communication or in the middle of the communication or a combination thereof. For example, an audio message may be overlaid with a voice communication that is about to start, or it may be overlaid in the middle of the communication or it may be overlaid periodically in the middle of the communication. The other party to the voice communication also hears the audio messages, even though they do not have the device that is equipped with the device message function 18. The duration and type of the audio messages so integrated with the communication are such that they do not unduly interfere with the communication, yet forces the message to be exposed to the device user.

A similar approach for integrating commercial messages in the text messages may be used. A text message that originates from the device 12 may be inserted with an appropriately formatted commercial message, in the beginning of the message, in the middle of the message, or the end of the message, or a combination thereof. The text message recipient is also exposed to such commercial messages inside the SMS text message.

Another format for integrating messages is to display text or flash image messages on the screen of the device before the communication can be initiated or received.

A message interactivity function 55 enables the device 12 user to interact with a commercial message, if the message from the list of messages in the message file is pre-programmed for an interactivity feature. The message interactivity function 55, for a one or more of the messages in the message file that have an interactivity feature, enables the device user to interact with a message provider, when the message is exposed to the device user. These aspects of the message interactivity function are further described later in the specification.

The message interactivity sub-function 55 enables interactivity with commercial messages from a group that includes, a mini-game message format that enables the user to collect points for reward from a message provider, a poll question that enables a polling organization to collect responses to poll questions, and a product offering at special prices, enabling the device user to accept such a product offer. There may be other types of interactivity messages, besides those listed above and are not ruled out.

A device account sub-function 56 provides an account function that creates an account record identifying what commercial messages have been so used up in the communication by being displayed or exposed to the user and periodically sends that account record to the message server 20 via the wireless network 14. The account record keeps an account of messages, their type, and how frequently they have been used up by being exposed to the user.

The sub-function 56 sends the account record to the message server 20, in non-exclusive embodiments approximately every one hour, four hour, eight hour, twelve hour, twenty-four hour, seven days, every thirty days. In certain non-exclusive embodiments, the period of 24 hours may be preferred depending upon the need to provide a timely feedback to the message provider as well as to send a new refreshed message file, based on the frequency of message usage by exposure to the device user.

In a non-exclusive embodiment, the device 12 user may be able to change the mode of operation of the message exposure function to be able to bypass it and choose to pay for the device communication use minutes through a prepaid minutes feature and later switch to use the message exposure function again. The prepaid minutes feature as currently utilized or developed in the future, enables the device 12 user to pay for the minutes of usage through a prepaid account with the wireless carrier that services the device user.

A mode function 57 that provides switching on and off of the message exposure function may be carried out with the help of a function key on the device 12 that may switch or set a flag in the wireless carrier computer systems. Similar function keys are currently utilized in the device 12 to wirelessly access and/or control network resources such as, for voice message retrieval and for checking number of minutes remaining in the prepaid account. The mode function key would also switch on/off the execution of the message exposure function.

The switchback and forth feature using a mode function key may also be provided in conjunction with a currently utilized wireless service billed account. The ability to switch back and forth between the message exposure function that provides discounted or free usage of the wireless network and the prepaid or billed minutes feature enables the device 12 user to have flexibility in how to use the device 12. A given mode may remain set with the wireless carrier until switched to by the device user by using the mode function key.

A suitable advisory on the device 12 screen may alert the device 12 user, which mode he or she may be using the device 12 in. Alternatively the default mode may be the message exposure function mode and the prepaid-minutes mode may be selected on individual usages of the device 12. That is the mode may remain set in the message exposure function mode, unless switched to the prepaid minutes mode for each time of the device 12 usage.

Appropriate currently utilized or future developed information security measures may be used to assure that the source and destination of message files and account records between the message server 20 and device 12 are authenticated and protected.

A software program 102 operative in the mobile wireless communication device 12 that implements the device messaging function 18, as described above, is also shown in FIG. 3B.

The software program 102 has a function 102A that receives a message data file 74 from the message server 20; the message data file 74 having a one or more of commercial messages, and saves the message data file 74 in the storage memory of the device 12. The function 102A saves the messages in the memory of the device organized by message attributes associated with each message, where the message attributes are message type from audio, flash animation, video, message time duration in seconds, and criterion code.

The software program 102 further has a function 102B that senses initiation and continuation of communication originating from the device, such as, voice call, text message, and request for information, in the device and puts on hold the initiation of the communication.

The software program 102 further has a function 102C that selects a one or more of commercial message according to a preprogrammed criterion code 73 from the message data file 74 in the memory of the device 12. The function 102C implements the pre-programmed criterion for selecting messages from the list 74, based on message type, message duration and message frequency attributes.

The software program 102 further has a sub-function 102D that exposes the selected messages to the device user before the initiation of the communication and during the communication. The sub-function 102D, on initiation of the communication, puts the communication function on hold, lets the message be exposed, and after removing the hold, let the communication originate from the wireless device.

For voice communication, the sub-function 102D, also temporally that is time wise, integrates a one or more of audio messages that are selected from the message list, in an outgoing voice communication. The sub-function 102D further, integrates a one or more of messages that are selected from the message list 74, in an outgoing text or e-mail message communication.

The software program 102 further has a function 102E that creates a record of account of which messages have been exposed, and saves such account records 76 in the local memory of the device 12.

The software program 102 further has a function 102F that using one of the methods of, periodically or on demand from the message server, sends such account record 76 to the message server 20.

The software program 102 further has a function 102G that implements an interactive function key on the mobile wireless device that enables the device user to interact with the message provider of an interactive message that has been coded to be an interactive message in the message list 74. As a simplified illustration, when the interactive function key is activated, during the exposure of a message, the function 102G may create an entry in the account record 76. When the account record 76 is sent to the server 20, the server may send the user response to the message provider. Alternatively or in addition, the function 102G may send a response directly to the message provider using the message provider address in the message list 74, enabling the message provider to immediately contact the device 12 user.

Commercial Message Formats

Figure 5A:
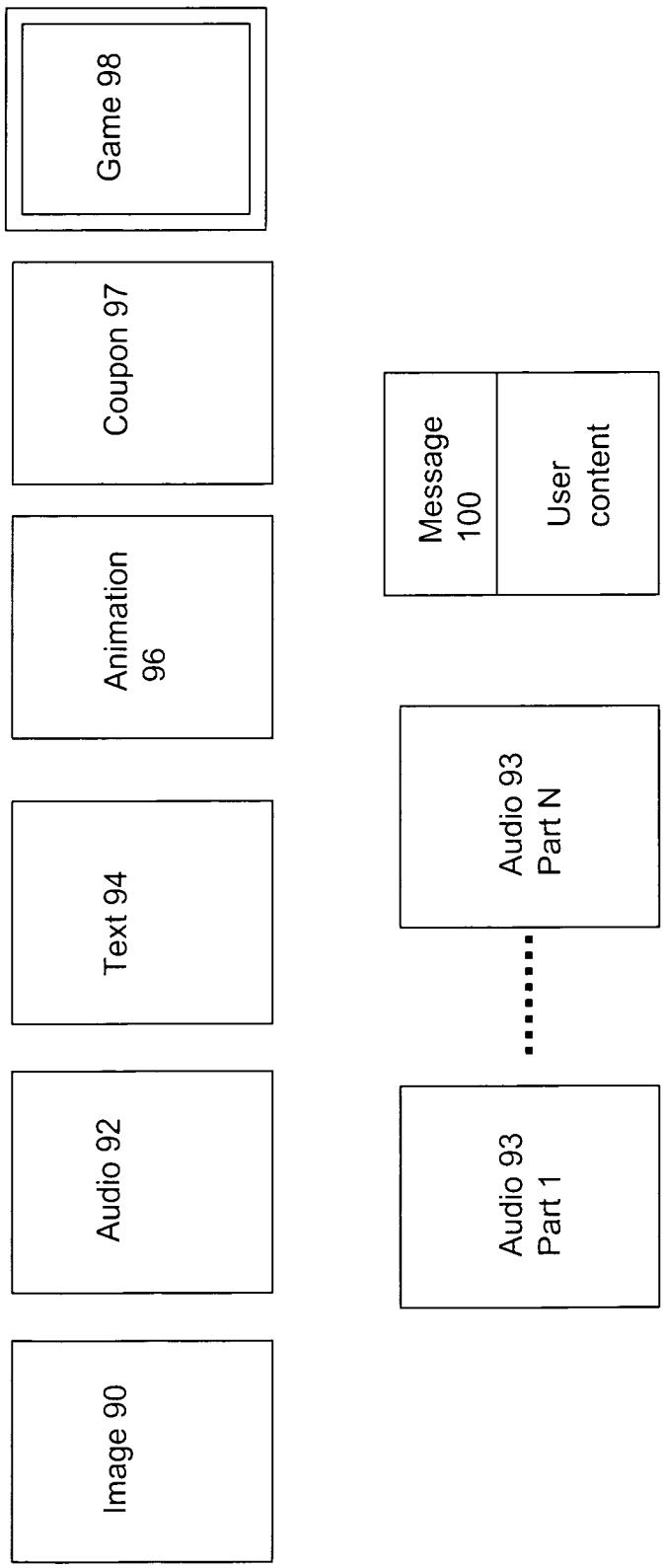
FIG. 5A illustrates message formats for one embodiment.

As illustrated in FIG. 5A, the commercial message format for mobile wireless advertising platform may include any number of formats such as, images 90, audio 92, text 94, animation 96, product coupons 97, and mini-games 98. Where the audio 92 is split in multiple parts, audio 93 may have part 1 to part N. The message format may also be in split screen format 100. The technology for creation of such message formats is prior art.

The format and duration of the commercial messages for exposure to the device 12 user is governed by a judicious balance between, interests of the message provider in providing effective messages for a targeted audience, interests of the system 10 provider in generating revenues from the message providers, and the interests of the device 12 user being provided a quality communication service that is free to the device 12 users in certain embodiments.

This judicious balance between different interests, as above, may include length of the message and format of the message and also how the message is exposed during and before and after the communication. The length of the message may be governed by the number of seconds the message is exposed at one time. For audio overlay during voice communication, in certain embodiments, that balance may lie in using approximately 5%-15% per minute, on average, of the time for an audio commercial message 92 overlay in a minute of the voice communication. If the commercial message is longer than 3 to 9 seconds, the message may be split in multiple parts. The multiple part audio message 93, such as a 15 second message may be delivered in two parts of 9 and 6 seconds each over a voice communication that would last more than two minutes.

For audio overlay message 92 and 93 over voice communication, the beginning and ending of the audio overlay may be marked by distinctive tones that alert the device user that the audio overlay has begun or has ended or would be continued.

For message overlay in short text messages, the commercial text message 94 may be marked by being highlighted by distinct characters or colors. In text messaging the commercial message may be placed at either the beginning or at the end of the text message and may be limited in size that is governed by the limitations of the text messaging protocol and standard.

The image message 90 that is exposed to the device 12 user by being displayed on the screen of device 12 may be limited in duration for a judicious balance. Such balance may require the image message duration to be limited between a few seconds to as much as 6 seconds. They can be shorter or longer. It is believed, the shorter message format is useful in brand building and longer messages may be useful in making an offer for a product/service sale at preferred terms or to highlight a distinguishing feature of the product or service.

A mini-game message format 98 may embed a game, where the game background or content may be a commercial message and enable the user to collect cumulative points over time for playing the game, enabling the user to spend more time interacting with the message. The game message technology itself is prior art and the modern device 12 are embedded with currently utilized or developed technology features that enable game playing features.

An animation based message format 96 may use any number of currently utilized or future developed technologies, such as flash to create moving images that would highlight the commercial message. Such messages are limited in duration and may be longer than the non-animated image messages as they hold the attention and convey an animated message to the device 12 user.

A product coupon message format 97 is an offer for a product at a reduced or discounted price. The message may display the image of the product and the discount and the time limitations. The coupon format may include a coupon code as a bar code or numerical code that may be used to enter in an online transaction and be scanned by a merchant retail scanner. When a message format 97 is exposed to the device 12 user, the message may be saved in a coupon file by use of a function key, by the device user for later retrieval and use at time of a purchase transaction with the merchant which provide the specific coupon message.

A split screen message format 100 partitions the device 12's screen display into a commercial message part, leaving the other part to be used for user text messages. The technology for providing such split screens with different contents is prior art.

Devices 12 may have different size screens. Devices 12 that provide for a touch sensitive display screen may have larger screen sizes. The message server 20 may have a prior knowledge of the screen size of each device 12 and that information may be used to structure the image commercial messages that are sized to the screen of the device 12. Such prior knowledge of the device type and thus the screen size may be collected in the database 24 when the device 12 with the device message function is first put in use.

Message Interactivity

The system 10 may provide for interactivity between the device 12 users and the message provider, enabling the device user to interact with the commercial message. Such interactivity data may be collected in the account record 76 or may be sent to the message provider immediately.

The device user may choose to respond to an interactive commercial message via activating a special function key (not shown), on the device 12, and such activation is recorded in the account record 76 that is created and maintained in the device 12.

The system 10 may generate acknowledgment thank you text messages to the device user in response to interactive commercial messages so that the user would know the interactive response has been recorded and has been or would be conveyed to the message provider.

Alternatively or in addition, if the message format has an interactive feature that enables the device user to show an interest in the content of the message, the user may receive a direct message from the message provider. For this, the message in the message list 74 in the device 12 may be coded with the message provider URL address and the account record function may be preprogrammed to send the response directly to the message provider via the wireless network 14.

If the message delivery was via audio overlay during a voice conversation, a special function key on the device 12 may be activated to record response to the audio message in the account record 76. The technology itself of programming such features in a mobile wireless device is prior art.

If the message delivery was via image display on the device screen, during initiation of communication, another or the same special function key on the device 12 may be activated to record response to the image message in the account record 76. The technology itself of programming such features in a mobile wireless device is prior art.

The system 10 may also adapt the above described technology features to provide for polling questions, as an interactive message format that may be sent to device 12 as a special kind of time sensitive message, by a polling organization via the message server 20. By a suitable web-interface (not shown), the polling organization may select an appropriate demographics for distribution of these polling questions.

The message server 20, by assigning a unique criterion code to these polling questions, would enable the device message function 18 to expose the polling questions as an interactive message format and then send message responses immediately to the message server 20 for collecting the polling data. For the polling application, the poll questions may be simplified as either yes/no or a selection from a few choices.

Method of Operation

A method diagram of some of the features of the software function 102 may include the method steps as shown in FIG. 4A for text message communication and FIG. 4B for voice communication.

As illustrated in FIG. 4A, the steps for integrating commercial messages in the text message communication 32 are illustrated for the outgoing text message 32A, and incoming text message 32B. As illustrated, in an outgoing text message 32A two different commercial messages may be integrated and exposed to the device 12 user, one before the user can access the text message functionality and the second embedded in the text message itself.

The method steps for outgoing text message 32A may be:
sense initiation of text messaging on device 12
delay/hold initiation
search list 74 to find a commercial message based on criterion code
retrieve the message from the list
display the message on the screen for a predetermined time
update account record
remove hold of initiation of text messaging
let the entering of the text message be completed
search list 74 to find a commercial message based on criterion code
integrate the message in the body of the text message
update account record
let the text message be sent from device 12

For an incoming text message 32B, only one commercial message is exposed after the text message retrieval function on device 12 is activated by the device user. The criterion code is used to search what types of messages would be appropriate for the different types of exposure of messages as in here.

The method steps for an incoming text message 32B may be:
sense initiation of text message retrieval on device 12
delay/hold initiation
search list 74 to find a commercial message based on criterion code
retrieve message from the list
display the message on the screen for a predetermined time
update account record
remove hold of initiation of text message retrieval.

As illustrated in FIG. 4B, the steps for integrating commercial messages in the voice communication 34 are illustrated for the outgoing voice communication 34A, and incoming voice communication 34B. As illustrated, in an outgoing voice communication 34A, two or more different commercial messages may be integrated and exposed to the device 12 user, one before the user can access the voice communication functionality and the second and third or more by audio overlay in the active voice communication itself depending on the duration of the communication. Distinctive audio tones may be used to alert the user for overlaying the audio messages.

The method steps for an outgoing Voice Communication 34A may be:
sense initiation of voice communication on device 12
delay/hold initiation
search list 74 to find a message based on criterion code
retrieve message
display the message on the screen
update account record
let dialing out resume for voice communication search list 74 to find message based on criterion code
integrate the audio message during the communication
use distinctive tone to begin and end message
update account record
repeat, with a different message if the voice communication exceeds 3 minutes.

For an incoming voice communication 34B, one or more commercial message may be exposed to the user. The message exposure may be in the form of an image on the screen before the incoming voice communication is picked up and/or may be an audio overlay after the incoming voice communication is picked up. As a simplified illustration, the message may be very brief such as "Network services provided as a courtesy of brand X". The criterion code in each message is searched to select those types of messages that would be appropriate for the different types of exposures of commercial messages based on device 12 usage.

The method steps for an incoming Voice Communication 34B may be:
sense initiation of voice communication on device 12
delay/hold initiation
search list 74 to find a message based on criterion code
retrieve message
display the message on the screen
update account record
let phone pick up resume for voice communication
search list 74 to find message based on criterion code
integrate the audio message during the communication
update account record Communication Service Agreement with the Device 12 User Currently utilized or a future developed mobile cell wireless devices may be customized with the device message function 18 and device software 102, so that a device buyer may buy and select any device and the purchased device may be loaded with the device message function 18 and software at the point of sale of the device.

The device message function 18 may also have a register function to register the device 12 with the message server 20. The message server 20 may have a function to register the device 12 with the telecom network service provider. Alternatively the register function may register the device with the telecom service provider first, which then can register the device with the message server 20.

At the device purchase time of a device embedded with the device message function 18 and software 102, the buyer/user may be asked to sign an agreement. Such an agreement may provide for collection and use of basic demographics data such as address/location, age, gender, profession, income level, language of choice, and life-style options of a primary user. Such data is routinely collected and the device buyer is not expected to object in return for unlimited free service as well as being provided commercial messages that are relevant to them. The agreement may also provide for a privacy policy as required by applicable laws.

In addition, a clause in the service agreement may provide for renewable service periods of a year each, so that when the service is renewed the demographics may be refreshed and updated. For those not renewing, the service may be cancelled after a grace period. This may be accomplished by sending messages to the device and receiving an appropriate response.

In addition a clause in the service agreement may provide termination of service in case of misuse. The misuse may include excessive use beyond a threshold, selling the device to others without notification to the system, and losing the device and not informing the system of such a loss.

The device agreement may also include periodic audits of the device 12 owner or user, such as change in ownership and other factors via audit message and response to such message.

If the terms of the service agreement are violated, the device communication service may be cancelled by first suspending or canceling the account at the message server 20 and the message server 20 sending a cancellation note to the telecom service provider for them to remove the SIM and telephone number from their account.

As part of a bulk service agreement with the telecom service provider, there may be a SIM account list file maintained at the message server 20, which is uploaded to the telecom service provider on a periodic basis to keep current the list of accounts in both the message server and in the systems of the telecom service provider.

The telecom service provider does not and may not need to perform billing functions and only maintains the total minutes used for each account. The total minutes used per device in a time period may be downloaded to the message server 20 from the telecom service provider. The system 10 may keep track how the minutes are being used and to correlate that data with its internal records based on the account records received from each device, as well as to provide for a payment to the telecom service provider based on the bulk service agreement.

In certain embodiments, since the usage of the wireless network 14 is free to the device 12 users, but is paid for from the revenue generated from the message providers that interact with the device 12 through the message server 20, other commercial message providers that may attempt to reach the device 12 users directly may be prohibited from using such free network resources. A clause in the service contract may provide for identification of such other message providers, so that claims for unauthorized use of the network resources may be pursued against them.

Service Functions

As has been described earlier with reference to FIG. 1B, the wireless advertising platform system 10 has a wireless device 12 that has an information almanac function interface to be able to input a category, name in a category and be provided to the user, information associated with the name and category, where the name may be a person, monument, place, weather, sporting event, art event, or news event. The device 12 may also have a directory function interface to be able to input a name, type, city and state, and provides a telephone number and or address for the name.

Information from these service functions that is presented to the device 12 user may be embedded with commercial messages from the message file in the device 12 which has been described earlier.

Message Provider Interface 23 with Message Server 20

As described earlier with reference to FIG. 1A, message providers have an interface with the message server 20 to be able to enter commercial messages into the message server 20 and check the status of the exposure of such messages from the message database 24. Message provider interface 23 may include a combination of traditional currently utilized or a future developed web-based approaches to interact with the message server 20 as well as interactions that are unique for this system 10. The features and aspects of the message provider interface are illustrated with reference to FIGS. 6A and 6B.

As illustrated in FIG. 6A, a method for commercial message provider interface 23 with the message server 20 that delivers messages to handheld wireless devices 12 for exposure there from to the device 12 owner on using the device, has the following method steps, where the steps may not be in the order listed or the method may not use all of the steps.

At step 110, planning and designing an advertising campaign using the wireless device message delivery format of the preferred embodiment;

At step 112, deciding, by the message provider, the message format types from a number of formats and providing a corresponding message file in a web interface to the message server;

At step 114, deciding by the message provider, on the message delivery demographics, the number of deliveries, and the time period of delivery for exposing the message to the wireless device user during wireless device usage;

At step 116, activating the campaign by paying for the campaign via a payment method;

At step 118, collecting status for message exposure to wireless devices from the message server; and At step 120, refining the mobile advertising campaign by changing the message type, delivery demographics, and period of delivery.

Figure 6B:
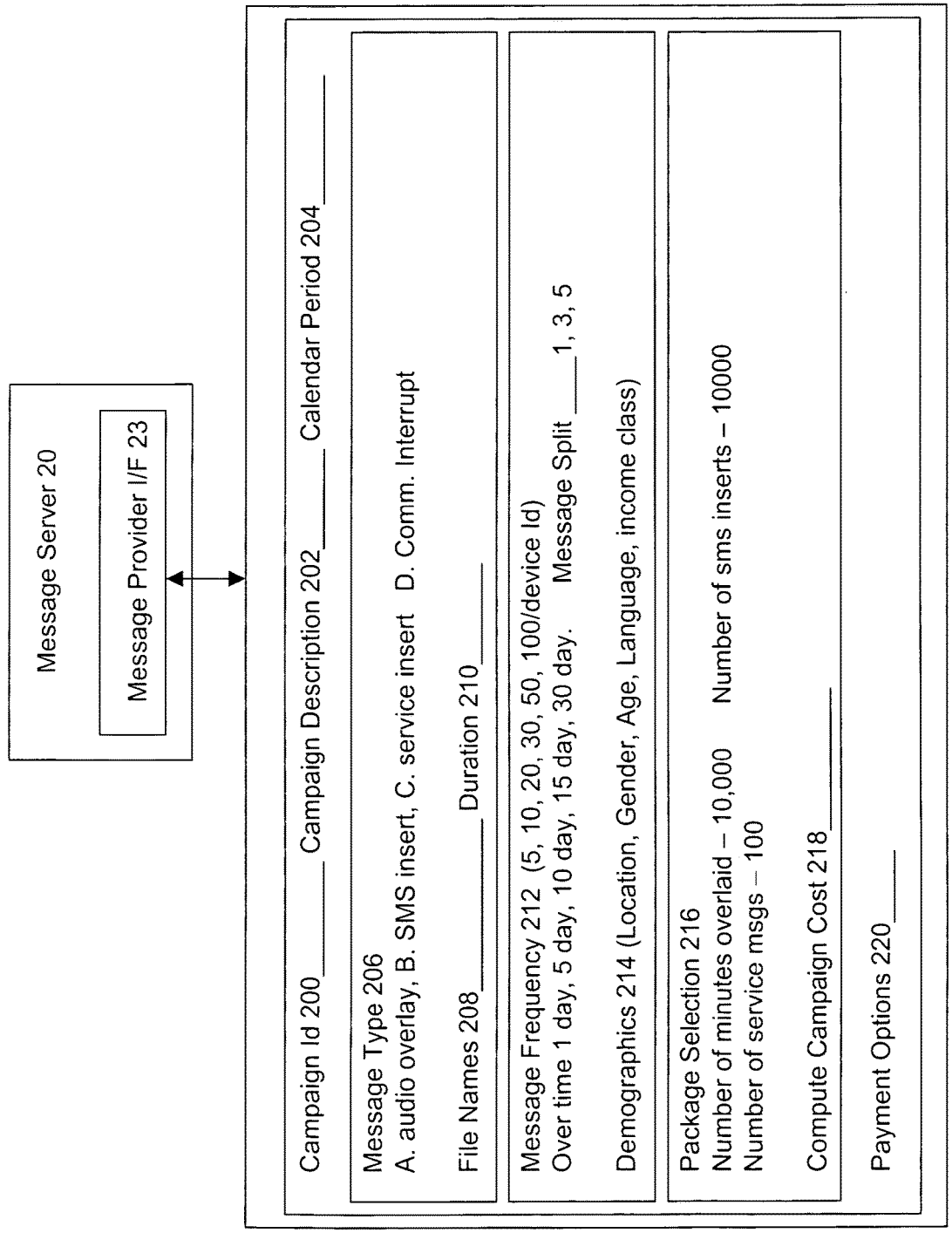
FIG. 6B is a block diagram that illustrates a version of one embodiment of the message provider interface.

FIG. 6B illustrates a web interface with features such as campaign identification 200 and description 202, calendar period 204, message type 206, message file 208, message duration 210, message frequency 212, preferred demographics 214, package selection 216, and campaign cost total 218, payment and contract provisions 220, that would allow an advertising manager to interface with the message server in planning and placing an advertising campaign.

A similar interface, not shown, may be used for message exposure feedback, such as getting feedback, when and how the message was exposed by device id, message and number of deliveries, date/time as well as graphical representation of such data using different graph formats for analysis and refinement of the campaign based on real world results that are tied to response and market activity.

Method of Operation

As illustrated in FIG. 5B, a method for wireless advertising platform has the steps of, where the steps may not be in the order listed or the method may not use all of the steps.

At step 130, using a handheld wireless device to send and receive voice and text communication to and from a user's selected sources and destinations.

At step 132, receiving inbound wireless data of a message file from a message server.

At step 134, storing the message file from message server in the device 12 memory, the message may be in any number of formats.

At step 135, selecting the mode of the device 12 use as message exposure.

At step 136, initiating or receiving a communication by the wireless device user.

At step 138, exposing the stored messages to the user before device use, that is, before the user can initiate or receive communication.

At step 140, limiting the number of messages so exposed in number and duration not to exceed a threshold.

At step 142, integrating stored messages in the communication of the user.

At step 144, having a location capability in the wireless device and communicating the device location to the message server enabling the server to send messages specific to a location of the device.

At step 146, sending by the message server messages to device 12 that are specific to the device 12's location.

At step 148, in exchange for being exposed to the commercial messages, billing discounted fees to the user by the telecom service provider for communication services.

At step 150, charging optionally one time charge to the user based on the type of the device that is selected by the user.

At step 152, identifying the messages in the message server to message providers and tracking the messages in the server by a message ID.

At step 154, storing messages in the message server that are time tagged and are sent in to the device and refreshed periodically.

At step 156, tracking which messages have been displayed, number of times messages have been displayed and sending an account record to the message server; the device has a message tracking function.

At step 158, receiving account records, by the message server, from the device 12, and storing them in the message server.

At step 160, using cumulative account records to create statistical and billing statements to the message providers.

At step 162, limiting the messages duration to create a mental impression.

At step 164, creating flash-based motion messages for exposure to device 12 users.

At step 166, embedding a message in the surrounding space of device 12's screen when the screen is being used for a device function.

At step 168, embedding in the device 12's display screen, a message in the format of a mini-game.

At step 170, providing in the device, a directory function to be able to input a name, type, city, and state that provides a telephone number and/or address of the name.

At step 172, providing in the device, information, and an almanac function to be able to input a category or name in a category and be provided to the user, information associated with the name and category, where the name may be a person, monument, place, weather, sporting event, art event, or miscellaneous item.

In summary, the systems 10 and 10A, for mobile wireless advertising platform and their variations provide commercial messages to be delivered to the mobile devices 12 from the message server 20 and integrated with the communications originating or ending in the device 12 to another device 12A, where the use of the device 12 is free without cost to the user and the device 12 itself may be free in return for being exposed to these messages before and/or during communication, thus providing a benefit to the message providers and the device users.

While the particular method and apparatus as illustrated herein and disclosed in detail is fully capable of obtaining the objective and providing the advantages herein before stated, it is to be understood that it is merely illustrative of the presently preferred embodiments and that no limitations are intended to the details of construction or design herein shown other than as described in the appended claims.

What is claimed is:

1. A wireless mobile advertising system, the system comprising:
    a handheld wireless mobile device wherein the handheld wireless mobile device is a smart phone with a display and a touch screen, wherein the handheld wireless mobile device has a CPU, a memory and a plurality of logics stored in the memory and operating in the CPU, wherein the handheld wireless mobile device is pre-registered with a message server on a global computer network, wherein communications between the handheld wireless mobile device and the message server are implemented using a security protocol;

the plurality of logics, stored in the handheld wireless mobile device, include a receive logic, wherein the receive logic has an inbound wireless data function and a storage function in the handheld mobile wireless device, and is configured to wirelessly receive at any scheduled delivery of a single message file over a wireless network from the message server, on the global computer network, the single message file, with multiple commercial messages, and stores the single message file in the memory of the device;

the single message file has contained therein, multiple messages, wherein each of the multiple messages in the single message file has a plurality of stored attributes, the plurality of stored attributes including at least a criterion code, a message type, a message file, and a message time duration, wherein messages are selected for exposure according to their criterion code and the criterion code identifies one of algorithms for messages to be exposed only for outgoing text messages and algorithms for flash messages to be exposed only for service functions, and the criterion code also indicating a number of exposures during a period of time;

the plurality of logics additionally includes a message exposure logic, wherein the message exposure logic subsequent to the receipt and storage of the single message file in the mobile device detects onset of a communication function, wherein the communication function supports one or more of: voice telephone, text, and e-mail; and the message exposure logic then automatically selects a message from the single message file, using the criterion code associated with the selected message, and temporarily delays sending or receiving by the communication function for a brief period of time equal to the time duration of the selected message and exposes the message, by visually displaying or aurally annunciating the message to a wireless device user.

2. The system as in claim 1, wherein the handheld wireless mobile device includes:

the inbound wireless data function with the storage function receives and stores from the message server the message file that has a one or more of, audio, text, image, and flash animation formatted commercial messages.

3. The system as in claim 1, wherein the handheld wireless mobile device includes:

stored in the memory and executing in the CPU an integrate logic that integrates the commercial messages from the memory of the handheld wireless mobile device into incoming and outgoing communications to and from the wireless device user; and a number of messages integrated in a single communication is limited in number and duration not to exceed a threshold.

4. The system as in claim 1, wherein the handheld wireless mobile device includes:

stored in the memory and executing in the CPU a message interactivity logic that enables interactivity, for one or more of the messages in the message file that have an interactivity feature.

5. The system as in claim 4, wherein the message interactivity logic includes:

an interactivity function for commercial messages from a group that includes, a mini-game message format, a poll question, and a product offering at special prices.

6. The system as in claim 1 wherein the handheld wireless mobile device includes:

stored in the memory and executing in the CPU an almanac logic that inputs an identification of a category, a name in that category and be provided to the user, information associated with the name and the category, wherein the information provided to the user embeds a commercial message from the message file in the storage memory of the device.

7. The system as in claim 1, wherein the handheld wireless mobile device includes:

stored in the memory and executing in the CPU a mode logic that in the handheld wireless mobile device switches between two different modes of paying for the device use that of (i) a mode of the device use with the message exposure logic where the communication use cost of the handheld wireless mobile device is discounted to the wireless device user in return for being exposed commercial messages and (ii) a mode of the device use with a billed account with a wireless carrier without the message exposure logic and not being exposed to commercial messages during device use.

8. A wireless mobile advertising system, the system comprising:

a handheld wireless mobile device wherein the handheld wireless mobile device is a smart phone with a display and a touch screen, wherein the handheld wireless mobile device has a CPU, a memory and a plurality of logics stored in the memory and operating in the CPU;

the plurality of logics includes a receive logic, wherein the receive logic has an inbound wireless data function and a storage function in the handheld wireless mobile device, wherein the receive logic wirelessly receives over a wireless network from a message server, on the global computer network, a single message file and stores in the memory of the handheld wireless mobile device;

the single message file has contained therein, multiple commercial messages that have been pre-selected for a device user demographics by the message server and wherein each of the multiple commercial messages in the single message file has a plurality of stored attributes, the plurality of stored attributes including at least a criterion code, a message type, a message file, and a message time duration, wherein messages are selected for exposure according to their criterion code and the criterion code identifies different algorithms to be used to expose different formats and types of associated messages, the criterion code identifies one of algorithms for messages to be exposed only for outgoing text messages and algorithms for flash messages to be exposed only for service functions, and the criterion code also indicating a number of exposures during a period of time;

the plurality of logics includes a message exposure logic, wherein the message exposure logic subsequent to the receipt and storage of the single message file in the mobile device, temporarily delays a communication operation, wherein the communication operation is one or more of: voice telephone, text and e-mail; and the message exposure logic then automatically selects a message from the single message file, using criterion code associated with the selected message, and temporarily delays sending or receiving by the communication operation for a brief period of time equal to the time duration of the selected message and exposes the message, by visually displaying or aurally annunciating the message to a wireless device user.

9. A method of using wireless mobile advertising system, the method comprising the steps of:
providing a handheld wireless mobile device wherein the handheld wireless mobile device is a smart phone with a display and a touch screen, wherein the handheld wireless mobile device has a CPU, a memory and a plurality of logics stored in the memory and operating in the CPU, wherein the handheld wireless mobile device is pre-registered with a message server on a global computer network, wherein communications between the handheld wireless mobile device and the message server are implemented using a security protocol;
providing in the plurality of logics, stored in the handheld wireless mobile device, a receive logic, wherein the receive logic has an inbound wireless data function and a storage function in the handheld wireless mobile device, and is configured to wirelessly receive at any scheduled delivery of a single message file over a wireless network from the message server, on the global computer network, the single message file, with multiple commercial messages, and stores the single message file in the memory of the handheld wireless mobile device;
providing in the single message file, contained therein, multiple messages, wherein each of the multiple messages in the single message file has a plurality of stored attributes, the plurality of stored attributes including at least a criterion code, a message type, a message file, and a message time duration, wherein messages are selected for exposure according to their criterion code and the criterion code identifies different algorithms to be used to expose different formats and types of associated messages, the criterion code identifies one of algorithms for messages to be exposed only for outgoing text messages and algorithms for flash messages to be exposed only for service functions, and the criterion code also indicating a number of exposures during a period of time;
providing in the plurality of logics, additionally a message exposure logic, wherein the message exposure logic subsequent to the receipt and storage of the single message file in the mobile device detects onset of a communication function, wherein the communication function is one or more of: voice telephone, text, and e-mail; and
selecting automatically by the message exposure logic, a message from the single message file, using the criterion code associated with the selected message, and temporarily delays the sending and receiving of the communication function for a brief period of time equal to the time duration of the selected message and exposes the message, by visually displaying or aurally annunciating the message to a wireless device user.

10. The method as in claim 9, further comprising the steps of:
receiving inbound wireless data of a message file by the message receive file logic with a one or more of commercial messages including one or more of a format from a group of, audio, text, image, and animation from a message server into the handheld wireless mobile device and storing the commercial messages in a storage memory of the handheld wireless mobile device and
wherein the criterion code includes a number of exposures during a period of time for one of a directory application or an almanac application.

11. The method as in claim 9, further comprising the steps of:
integrating the commercial messages by an integrate logic from the storage memory of the handheld wireless mobile device within the communication of the user and limiting the number of messages so integrated in number and duration not to exceed a threshold.

12. The method as in claim 9 further comprising the steps of:
providing an interactivity feature by an interactivity logic in the message enabling the wireless device user to interact with a message provider, when the message is exposed to the wireless device user; and
providing in the plurality of logics a message tracking logic, wherein the message tracking logic creates an account record that identifies the handheld wireless mobile device, identifies which messages from the single message file have been exposed on the handheld wireless mobile device, and identifies the number of times each exposed message has been exposed on the handheld wireless mobile device; and wherein the message tracking logic periodically sends the account record to the message server.

13. The method as in claim 9 further comprising the steps of:
providing in the device an almanac logic that inputs an identification of a category and a name in that category and providing to the user information associated with the name and category, and exposing commercial messages from the message file when providing the information and wherein the criterion code includes the number of exposures during a period of time for the almanac logic.

14. The method as in claim 9, further comprising the steps of:
selecting by a mode function key a mode logic that switches, between modes of device use, a mode of device use with the message exposure function with the communication use cost of the handheld wireless mobile device discounted to the wireless device user in return for being exposed commercial messages and a mode of device use with a billed account with a wireless carrier.

15. A mobile wireless communication device of a device user, the device comprising:
a smart phone with a display and a touch screen and that has a CPU and a memory and stored and operating therein a commercial messaging logic, wherein the commercial message logic wirelessly receives and stores a single message file and contained therein in the single message file a plurality of messages, wherein each message in the single message file has a plurality of stored attributes, the plurality of stored attributes including at least a criterion code, a message type, a message file, and a message time duration, wherein messages are selected for exposure according to their criterion code and the criterion code identifies different algorithms to be used to expose different formats and types of associated messages, the criterion code identifies one of algorithms for messages to be exposed only for outgoing text messages and algorithms for flash messages to be exposed only for service functions, and the criterion code also indicating a number of exposures during a period of time; and the commercial message logic executes a device function that makes a determination of initiation and continuation of communication from the device, and automatically selects a commercial message from the single message file according to the criterion code associated with the selected message, wherein the communication is one or more of: voice call, text message, and e-mail; and the commercial message logic executes a message exposure function that exposes the message by displaying and/or aurally playing the message, wherein the message exposure occurs before or during interruption of a communication.

16. The device as in claim 15, further comprising:

the commercial message logic stores and executes a function that receives a message file from a message server, the message file having a one or more of commercial messages, and saves the message file in the storage memory of the device.

17. The device as in claim 16, further comprising:

the commercial message logic saves the messages in the storage memory of the device organized by message attributes associated with each message, where the message attributes include message type from audio, flash animation, video, message time duration in seconds, and frequency of exposure.

18. The device as in claim 15, further comprising:

a. the commercial message logic makes a determination of initiation of the communication, in the device and puts on hold the initiation of the communication;

b. the commercial message logic selects a one or more of commercial message according to a criterion code, from a message data file pre-stored in the memory of the device; and c. the commercial message logic exposes the selected messages to the device user, and only then by removing the hold, let the communication originate from the wireless device.

19. The device as in claim 15, further comprising:

the commercial message logic integrates one or more of audio messages that are selected from the message file, into an outgoing voice communication by overlaying the one or more audio messages at the beginning, middle, or end of the outgoing voice communication.

20. The device as in claim 15, further comprising:

the commercial message logic integrates a one or more of text messages that are selected from the message file, in an outgoing text message communication.

21. The device as in claim 15, further comprising:

the commercial message logic implements an interactive function key on the mobile wireless device for the device user to interact with the message provider of an interactive message.

22. The system of claim 1, wherein the message exposure logic detects onset of a camera function or a music function and wherein the message exposure logic puts on hold the detected camera function or music function for a brief period of time at least as long as the selected message.

23. The system of claim 8, wherein the message exposure logic detects onset of a camera function or a music function and wherein the message exposure logic puts on hold the detected camera function or music function for a brief period of time at least as long as the selected message.

24. The method of claim 9, wherein the provided message exposure logic detects onset of a camera function or a music function and wherein the message exposure logic puts on hold the detected camera function or music function for a brief period of time at least as long as the selected message.

* * * * *